J. H. MERSHON AND W. T. JEFFRIES.
VAPOR GENERATING AND BURNING APPARATUS.
APPLICATION FILED JULY 15, 1921.
1,438,846.
Patented Dec. 12, 1922.
2 SHEETS—SHEET 1.
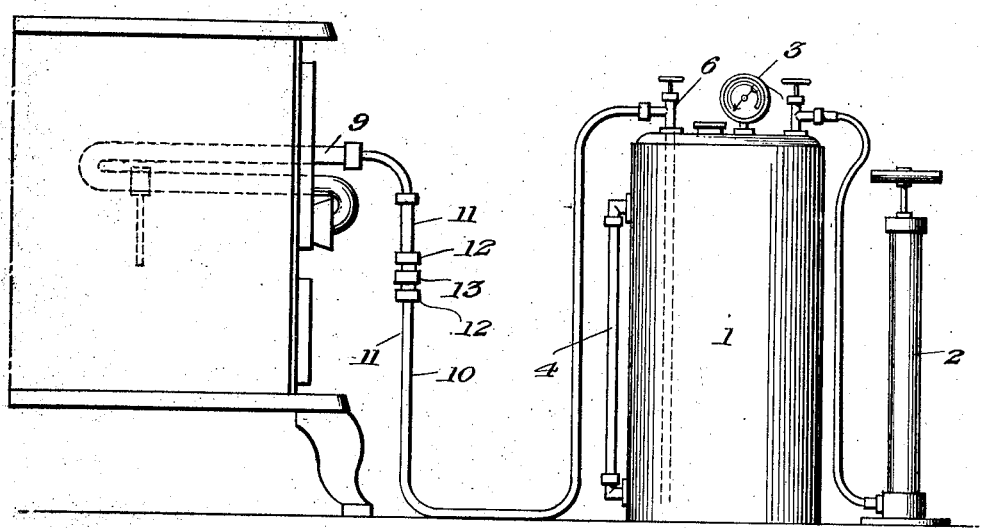
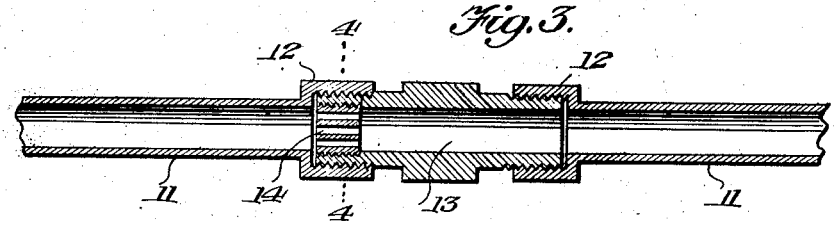
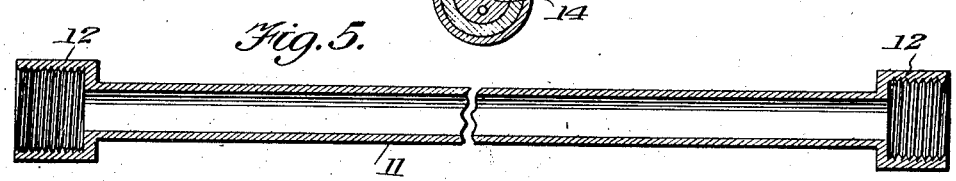
J. H. Mershon
W. T. Jeffries
INVENTOR
BY Victor J. Evans
ATTORNEY

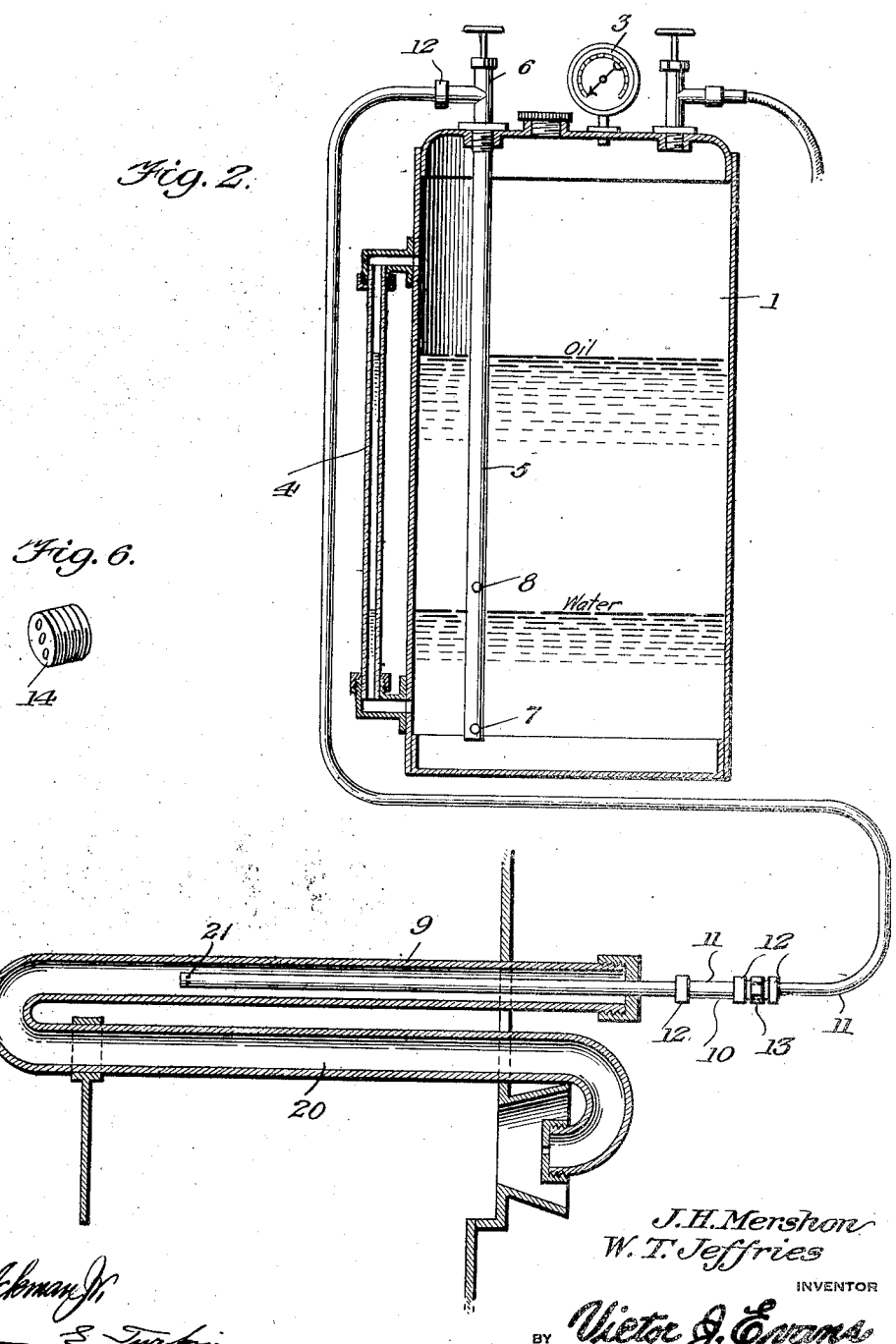

Patented Dec. 12, 1922.

1,438,846

UNITED STATES PATENT OFFICE.

JOHN H. MERSHON AND WILLIAM T. JEFFRIES, OF VAN ALSTYNE, TEXAS.

VAPOR GENERATING AND BURNING APPARATUS.

Application filed July 15, 1921. Serial No. 484,957.

*To all whom it may concern:*

Be it known that we, JOHN H. MERSHON and WILLIAM T. JEFFRIES, citizens of the United States, residing at Van Alstyne, in the county of Grayson and State of Texas, have invented new and useful Improvements in Vapor Generating and Burning Apparatus, of which the following is a specification.

The object of our present invention is the provision of a vapor generating and burning apparatus that is compact in construction and highly efficient in operation, and one that is susceptible of being perfectly controlled.

The apparatus is designed more especially, though not necessarily, for use in conjunction with a cook stove.

To the attainment of the foregoing, the invention consists in the improvement as hereinafter described and definitely claimed.

In the accompanying drawings, forming part hereof:—

Figure 1 is an elevation illustrating our novel apparatus as associated with a cook stove.

Figure 2 is an enlarged sectional view of the apparatus per se.

Figure 3 is an enlarged longitudinal section showing the conduit sections connected in accordance with our invention.

Figure 4 is a transverse section taken in the plane indicated by the line 4—4 of Figure 3.

Figure 5 is a detail longitudinal central section showing one of the conduit sections per se.

Figure 6 is a detail view of one of the mixing plugs comprised in the improvement.

Similar numerals of reference designate corresponding parts in all of the views of the drawings.

In furtherance of our invention we employ a tank 1 connected with an air compressing pump 2 and equipped with a pressure gauge 3. Said tank is also equipped with a transparent gauge 4, preferably of glass, and designed to enable the operator to see at a glance the quantities of water and hydro-carbon that are in the tank. Extending through the top of the tank 1 and downwardly to a point adjacent to the bottom thereof is a tube 5, characterized by a valved outlet 6. In furtherance of our invention the tube 5 is further characterized by an inlet opening 7 and an inlet opening 8. The inlet opening 7 of the tube 5 is for the entrance of water, and the opening 8 which is disposed immediately above the water line and near the bottom of the oil or hydrocarbon is for the entrance for the oil or hydrocarbon into the tube 5. At 9 is the burner of the apparatus, intermediate of which and the valved outlet 6 of the tube 5 is a sectional conduit designated generally as 10. The said conduit 10 is made up of a plurality of conduit sections 11 each of which is provided with enlarged interiorly threaded end portions 12. The conduit 10 may be of any desired length, and intermediate of the conduit sections 11 and also intermediate of one conduit section 11 and the induction end of the burner 9 we employ nipples 13, each of which is provided in its end portion toward the burner 9 with a mixing plug or device 14. The said plug or device 14 is perforated in the manner illustrated for the passage of oil and water, and incident to the said passage of the oil and water through the plug or device 14 a perfect mixture of the oil and water is accomplished.

The burner 9 is of generating type suitable to the fire box of a cook stove, though it is to be understood that the burner may be of a type adapted for use in a furnace. At the point where the conduit 10 is connected with the burner 9 the mixture of oil and water is quickly converted into vapor under air pressure from the tank 1, and from this it follows that a hot fire may be produced and one that may be perfectly controlled inasmuch as the supply of water and oil to the burner 9 is controlled by the valve 6.

Initially the generating burner may be heated with oil, wood alcohol, paper or any other substance that is adapted to burn quickly and afford high heat.

It will be apparent from the foregoing that the water and oil will enter the tube 5 separately, this being due to the fact that water is heavier than oil and hence the oil remains above the water. It will be understood of course that the burner 9 includes a coil 20 for vaporizing purposes which coil is provided with an appropriate eduction orifice.

By particular reference to Figure 2 it will be observed that the conduit 10 extends directly into the burner 9, and the hydrocarbon or hydrocarbons emerge from the conduit through the plurality of small holes 21 therein with the result that the hydrocarbon is quickly converted into vapor, and there is always sufficient vapor to maintain a steady fire and to raise the temperature of the fluid in the conduit 10.

It will also be apparent from the foregoing that the tubing directly enters the generating and vapor holding reservoir pipe, and the liquid passes through the small apertures from the tubing and instantly converts into steam and gas vapor the mixed fluid as the same passes from the tubing, and as the holder pipe the tubing empties into is open a storage of vapor is always present in sufficient quantity to maintain a steady fire and warm the cold fluids in the tubing.

Having thus described our invention, what we claim and desire to secure by Letters-Patent, is:—

1. Vapor generating and burning apparatus, comprising a generating burner, a tank, means connected with the tank for charging the same with air under pressure, a tube extending downwardly in the tank to a point adjacent to the bottom thereof and having at its lower end an induction opening for water and at an intermediate point of its length an induction opening for hydrocarbon, a valve controlling the outlet of said tube, and a conduit intermediate the said valve and the burner and having at intervals of its length mixing devices to thoroughly commingle hydrocarbon and water.

2. Vapor generating and burning apparatus, comprising a generating burner, a tank, means connected with the tank for charging the same with air under pressure, a tube extending downwardly in the tank to a point adjacent to the bottom thereof and having at its lower end an induction opening for water and at an intermediate point of its length an induction opening for hydrocarbon, a valve controlling the outlet of said tube, and a conduit intermediate the said valve and the burner and having at intervals of its length mixing devices to thoroughly commingle hydrocarbon and water; the said interposed conduit being made up of conduit sections, a nipple interposed between the contiguous ends of the conduit sections, a foraminous mixing device carried by the nipple, a nipple between one of the conduit sections and the burner, and a foraminous mixing device carried by the latter nipple.

3. In vapor generating and burning apparatus, a generating burner, a tank, means to charge the tank with air under pressure, a conduit intermediate the interior of the tank and the induction end of the burner; the said conduit having an aperture in the tank for the admission of water and a second aperture in the tank for the admission of hydrocarbon and also having between the tank and burner a foraminous mixing device to commingle passing hydrocarbon and water.

In testimony whereof we affix our signatures.

JOHN H. MERSHON.
WILLIAM T. JEFFRIES.